(12) United States Patent
Morishita

(10) Patent No.: US 7,826,122 B2
(45) Date of Patent: Nov. 2, 2010

(54) OPTICAL MODULATION APPARATUS

(75) Inventor: Tsuyoshi Morishita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/318,261

(22) Filed: Dec. 23, 2008

(65) Prior Publication Data
US 2009/0296192 A1  Dec. 3, 2009

(30) Foreign Application Priority Data
May 29, 2008  (JP) .............................. 2008-140834

(51) Int. Cl.
*G02F 1/01* (2006.01)
(52) U.S. Cl. ..................................... 359/239
(58) Field of Classification Search ................. 359/239, 359/248, 249; 372/26
See application file for complete search history.

(56) References Cited

U.S. PATENT DOCUMENTS 7,075,694 B2 * 7/2006 Jang et al. ................... 359/239

2004/0161249 A1  8/2004  Suda et al.

OTHER PUBLICATIONS

Patent Abstracts of Japan, Publication No. 2004-247968, published Sep. 2, 2004.
Patent Abstracts of Japan, Publication No. 3-251815, published Nov. 11, 1991.
Patent Abstracts of Japan, Publication No. 2001-339346, published Dec. 7, 2001.
Patent Abstracts of Japan, Publication No. 2008-092172, published Apr. 17, 2008.

* cited by examiner

*Primary Examiner*—Joseph Martinez
(74) *Attorney, Agent, or Firm*—Fujitsu Patent Center

(57) ABSTRACT

An optical modulation apparatus that performs optimum bias voltage control for optical modulation without using a pilot tone. A drive unit generates a drive signal by adding a bias voltage to an input data signal. A light modulation unit modulates input light output from a light source unit, in accordance with the drive signal, and outputs the results as optical signals. A forward monitoring unit monitors a forward signal of the light modulation unit and outputs the forward signal. A reverse monitoring unit monitors a reverse signal of the light modulation unit and outputs a reverse signal. A bias control unit controls the bias voltage so that a measured monitor ratio matches a target value of the ratio between the forward signal and the reverse signal, obtained when the operating point of the light modulation unit is in a predetermined position on its operation characteristic curve.

7 Claims, 14 Drawing Sheets

OPTICAL MODULATION APPARATUS

CROSS-REFERENCE TO RELATED APPLICATIONS

This application is based upon and claims the benefits of priority from the prior Japanese Patent Application No. 2008-140834, filed on May 29, 2008, the entire contents of which are incorporated herein by reference.

BACKGROUND OF THE INVENTION

1. Field of the Invention

The present invention relates to optical modulation apparatuses for performing optical modulation.

2. Description of the Related Art

Optical devices widely used in optical communication include optical modulators. In some optical modulators, an optical waveguide is formed on a substrate, and an input electric signal is converted to an optical signal by applying the voltage to the optical waveguide to change the amount of light absorption on the optical waveguide, thereby modulating the light intensity (external modulation).

FIG. 11 shows the structure of a conventional optical modulator 5. The optical modulator 5 includes a light source 50, an external modulation unit 51, a coupler 52, a photodiode (PD) 53, a bias control unit 54, and a drive unit 55.

The external modulation unit 51 has a Mach-Zehnder interferometer formed by an optical waveguide on a crystal substrate using a material having the electrooptic effect, which means that the refractive index changes with the application of an electric field, such as lithium niobate ($LiNbO_3$: LN). The Mach-Zehnder interferometer splits input light into two branches and combines them later.

The optical waveguide is split into two parallel waveguides 51$a$-1 and 51$a$-2. In the figure, a signal electrode 5$b$ is formed in a vicinity of the parallel waveguide 51$a$-1, and ground electrodes 5$c$ are formed on both sides of the signal electrode 5$b$. (The figure shows a single-electrode structure on a Z-cut substrate.)

The bias control unit 54 contains a low-frequency oscillator, adds an oscillated low-frequency signal to an internally-generated DC voltage, and outputs a low-frequency signal biased with the DC voltage.

The drive unit 55 performs amplitude modulation of the low-frequency signal, based on an input data signal of '0' or '1', generates a low-frequency superimposed signal by adding the low-frequency signal to the input data signal, and inputs the superimposed signal to the signal electrode 5$b$ of the external modulation unit 51. The external modulation unit 51 outputs an optical signal intensity-modulated by the low-frequency superimposed signal.

The PD 53 converts light output from the external modulation unit 51 and split by the coupler 52 into an electric signal and sends the signal to the bias control unit 54. The bias control unit 54 extracts the frequency component of a returned low-frequency signal included in the received electric signal, compares the phase of the frequency component of the internally oscillated low-frequency signal and the extracted frequency component of the low-frequency signal, detects a DC voltage that optimizes the operating point of the external modulation unit 51, and biases the low-frequency signal with the DC voltage.

The drive unit 55 generates a low-frequency superimposed signal by adding the optimally biased low-frequency signal to the input data signal and drives the external modulation unit 51 with the low-frequency superimposed signal.

A technique for controlling the amplitude of the drive signal of an LN modulator in variable increments (Japanese Unexamined Patent Application Publication No. 2004-247968 (paragraphs [0018] to [0024], FIG. 1) has been present conventionally.

In the external modulation unit 51, the operating point of optical modulation varies with temperature or time. Therefore, the optical signal output from the external modulation unit 51 and separated by the coupler 52 is converted to an electric signal by the PD 53; a low-frequency superimposed signal (pilot superimposed signal) is generated on the basis of the results of detection of the low-frequency signal (pilot tone) included in the electric signal; and automatic bias control (ABC) specified in the external modulation unit 51 is performed to optimize the bias voltage, as described above.

If the frequency component of the pilot tone appears in the electric signal, the bias voltage does not provide the optimum operating point. If the frequency component of the pilot tone does not appear in the electric signal, the bias voltage has been optimized. With this feedback control, the external modulation unit 51 is always controlled to operate at a constant operating point.

FIG. 12 shows the modulation characteristics of the external modulation unit 51. The vertical axis represents the optical output power of the external modulation unit 51, and the horizontal axis represents the bias voltage. The figure shows an operation characteristic curve and the waveforms of the pilot superimposed signal and the output light of the external modulation unit 51.

A middle point between the maximum value and the minimum value on the operation characteristic curve of the external modulation unit 51 is the operating point of the external modulation unit 51. The figure shows a state in optimum operation of the external modulation unit 51, without the frequency component of the pilot tone appearing in the electric signal converted from the output light. The bias voltage providing the optimum operating point is denoted as bias voltage Vop.

With the low-frequency pilot tone having frequency f0, output light that has been intensity-modulated by a signal having frequency 2f0 is obtained. In the figure, V$\pi$ represents a half-wave voltage. An amount of phase shift required to switch light between '0' and '1' is $\pi$, and a voltage necessary for that is referred to as a half-wave voltage.

FIGS. 13 and 14 show modulation characteristics at non-optimum operating points. If the operating point varies with temperature or time in the external modulation unit 51, the operation characteristic curve slides in the course of time along the horizontal axis on the coordinate system. FIG. 13 shows an operating point slid in the positive direction, and FIG. 14 shows an operating point slid in the negative direction.

The drift of the operating point causes the pilot tone (frequency f0) to be modulated in phase when the input data signal is '0' or '1'. With the in-phase modulation, the output light varies at frequency f0. As shown by a comparison between output lights in FIGS. 13 and 14, the phase of the output light having frequency f0 changes by $\pi$, depending on the direction of drift of the operating point.

With a positive drift of the operating point (Vop<Va, where Va is the bias voltage for the positive drift), the envelopes of the pilot superimposed signal and output light are in phase.

This can be seen in the pilot tone as well. The internally oscillated pilot tone and the pilot tone extracted from the electric signal after monitoring by the PD are in phase. In the automatic bias control process, when it is recognized from the result of phase comparison that the phases are the same, the bias control unit 54 lowers the current bias voltage Va.

With a negative drift of the operating point (Vb<Vop, where Vb is the bias voltage for the negative drift), the envelopes of the pilot superimposed signal and output light are in opposite phases.

This can be seen in the pilot tone as well. The internally oscillated pilot tone and the pilot tone extracted from the electric signal after monitoring by the PD are in opposite phases. In the automatic bias control process, when it is recognized from the result of phase comparison that the phases are opposite, the bias control unit 54 increases the current bias voltage Vb.

By comparing the phases of the internally oscillated pilot tone and the returned pilot tone, the relative position of the current bias voltage can be known with reference to the optimum operating point, and the bias voltage can be optimized. If the frequency component of the pilot tone does not appear, it can be recognized that the external modulation unit 51 is operating in the optimum state.

The automatic bias control process as described above includes operations such as adding a pilot tone to the modulation signal input to the external modulation unit 51, extracting the pilot tone from the output light of the external modulation unit 51 by monitoring by the PD, and correcting the bias voltage. These operations require large circuitry.

Although most of the recent optical communication devices are controlled by microcontrollers (chips incorporating a computer system containing a microprocessor, memory, I/O (peripheral devices), and the like), the conventional automatic bias control process requires many circuit elements in addition to the microcontroller because the pilot tone is used. Those circuit elements include an oscillator for oscillating the low-frequency pilot tone, a band-pass filter for extracting the pilot tone, a superimposing circuit for adding the pilot tone to the input data signal, and their peripheral circuits. This results in large circuitry and complicated control process.

SUMMARY OF THE INVENTION

In view of the foregoing, it is an object of the present invention to provide an optical modulation apparatus that controls a bias voltage for optimum optical modulation without using a pilot tone, making it possible to scale down the circuitry and simplify the control process.

To accomplish the above object, according to the present invention, there is provided an optical modulation apparatus for performing optical modulation. This optical modulation apparatus includes the following elements: a drive unit for generating a drive signal by adding a bias voltage to an input data signal; a light modulation unit for modulating input light in accordance with the drive signal and outputting optical signals; a forward monitoring unit for monitoring a forward signal of the optical signals output from the light modulation unit and outputting a monitored value as a forward signal; a reverse monitoring unit for monitoring a reverse signal of the optical signals output from the light modulation unit and outputting a monitored value as a reverse signal; and a bias control unit for obtaining a monitor ratio between the forward signal and the reverse signal and controlling the bias voltage in accordance with the monitor ratio. The bias control unit controls the bias voltage to bring the measured monitor ratio to a target value of the ratio between the forward signal and the reverse signal, obtained when the operating point of the light modulation unit is in a predetermined position on the operation characteristic curve of the light modulation unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
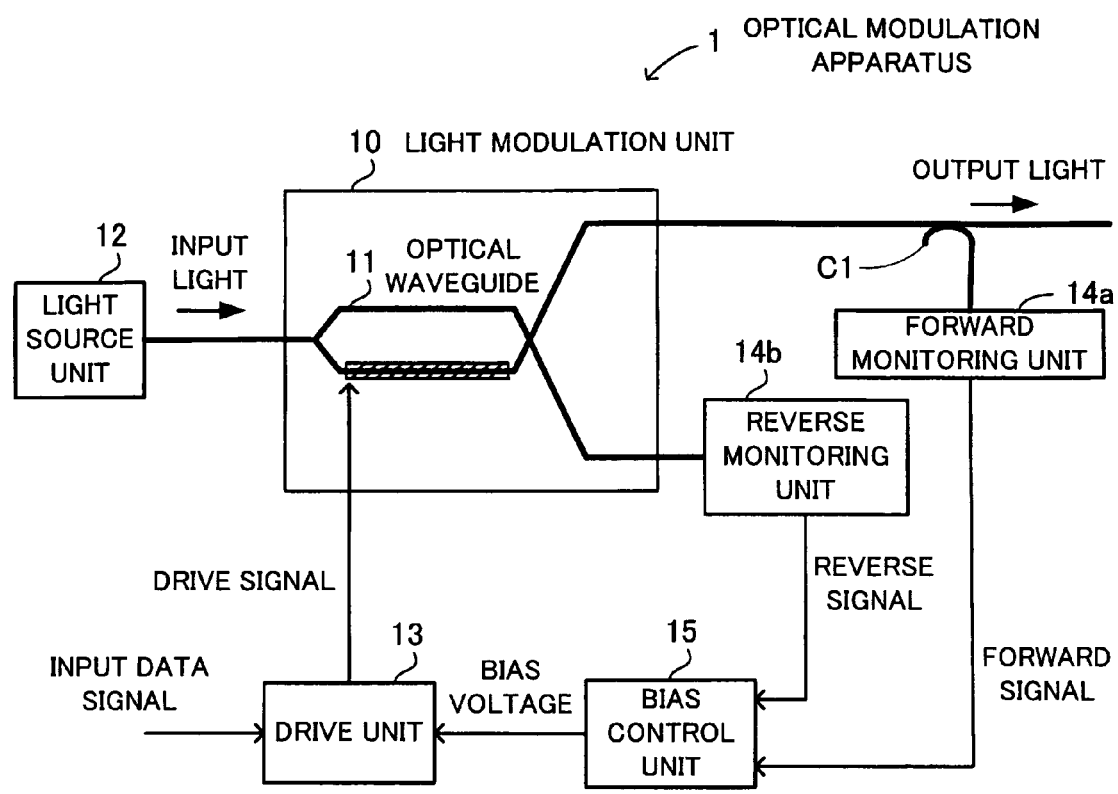
FIG. 1 shows the basic concept of an optical modulation apparatus.

Embodiments of the present invention will be described with reference to the drawings. FIG. 1 shows the basic concept of an optical modulation apparatus 1. The optical modulation apparatus 1 for performing optical modulation includes a light modulation unit 10 that includes an optical waveguide 11 of Mach-Zehnder interferometer type, a light source unit 12, a drive unit 13, a coupler C1, a forward monitoring unit 14a, a reverse monitoring unit 14b, and a bias control unit 15.

The drive unit 13 generates a drive signal by adding a bias voltage to an input data signal. The light modulation unit 10 modulates continuous light output from the light source unit 12 in accordance with the drive signal and outputs the results as optical signals.

The forward monitoring unit 14a monitors a forward optical signal output from the light modulation unit 10 and split by the coupler C1 and outputs the monitored value as an electric forward signal. The reverse monitoring unit 14b monitors a reverse optical signal output from the light modulation unit 10 and outputs the monitored value as an electric reverse signal.

The bias control unit 15 controls the bias voltage in accordance with the monitor ratio between the forward signal and the reverse signal. The bias control unit 15 has in advance a target ratio between the forward signal and the reverse signal, obtained when the operating point of the light modulation unit 10 is in a predetermined position on its operation characteristic curve (when the operating point of the light modulation unit 10 is in the optimum position), and performs feedback control of the bias voltage to be applied to the drive unit 13 so that the measured monitor ratio matches the target value. In the subsequent description, the forward signal will be referred to as forward monitor current, the reverse signal will be referred to as reverse monitor current, and the two signals will be collectively referred to as monitor current.

Figure 2:
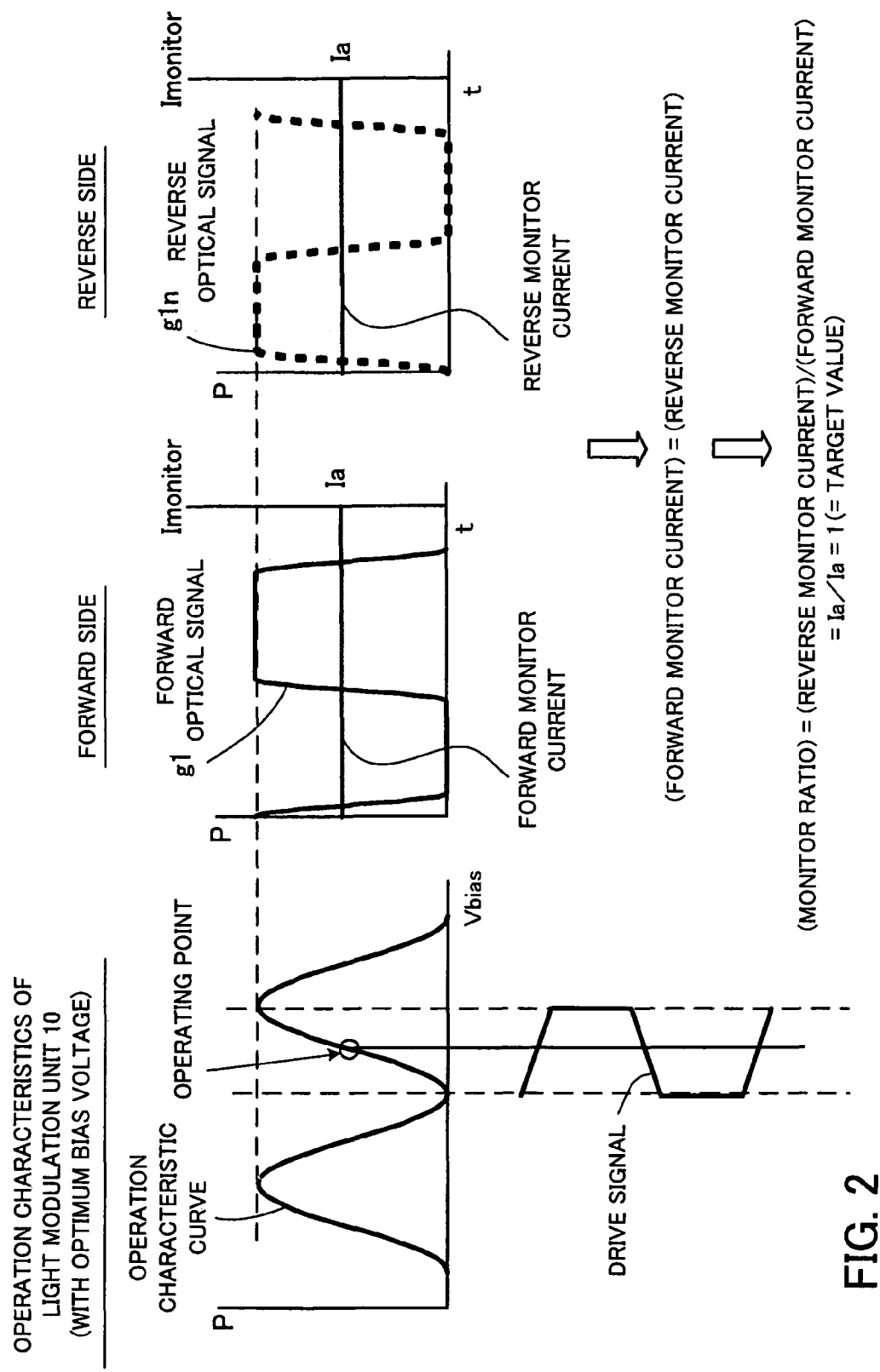
FIG. 2 shows relationships between monitor current and waveforms of output light from a light modulation unit.

Relationships between light output from the light modulation unit 10 and the forward monitor current and reverse monitor current will be described next. FIG. 2 shows relationships between the monitor current and the waveforms of the light output from the light modulation unit 10. In the graph showing the operation characteristics of the light modulation unit 10, the vertical axis represents light output power P (or light transmission amount) of the light modulation unit 10, and the horizontal axis represents bias voltage Vbias. The figure shows the operation characteristic curve and the drive signal in an operation state in which the light modulation unit 10 is operating at the optimum bias voltage.

In the graphs showing the waveforms of the output light, the vertical axis represents light output power P (or light transmission amount) of output light of the light modulation unit 10, and the horizontal axis represents time t. A current axis Imonitor is added to the graphs showing the waveforms of the output light, to indicate the forward monitor current and reverse monitor current measured when the light modulation unit 10 is operating at the optimum bias voltage.

If the light modulation unit 10 is driven by a drive signal for which the optimum bias voltage is specified, a middle point (operating point) between the maximum value and minimum value on the operation characteristic curve of the light modulation unit 10 agrees with the central voltage (optimum bias voltage) of the drive signal. In the corresponding output light from the light modulation unit 10, the forward optical signal has a waveform represented by a line g1, and the reverse optical signal has a waveform represented by a line g1n.

The average of the light output waveform in time (the average value of optical power (light transmission amount) in a certain time) appears as monitor current. The average of the forward optical signal in time appears as forward monitor current, and the average of the reverse optical signal in time appears as reverse monitor current.

Because the continuous light output from the light source unit 12 is modulated by the light modulation unit 10, the sum of the power of the forward optical signal and the power of the reverse optical signal is constant and equals to the optical output power or light transmission amount of the light modulation unit 10. Therefore, the sum of the forward monitor current and the reverse monitor current is constant.

These relationships mean that an increase in the forward monitor current decreases the reverse monitor current by the same amount and that a decrease in the forward monitor current increases the reverse monitor current by the same amount.

While the light modulation unit 10 is operating at the optimum bias voltage, the power of the forward optical signal equals the power of the reverse optical signal. Therefore, the forward monitor current and the reverse monitor current have the same value, which is denoted as Ia, as shown in FIG. 2, and the monitor ratio between the reverse monitor current and the forward monitor current becomes 1, meaning that the target monitor ratio is 1.

Figure 3:
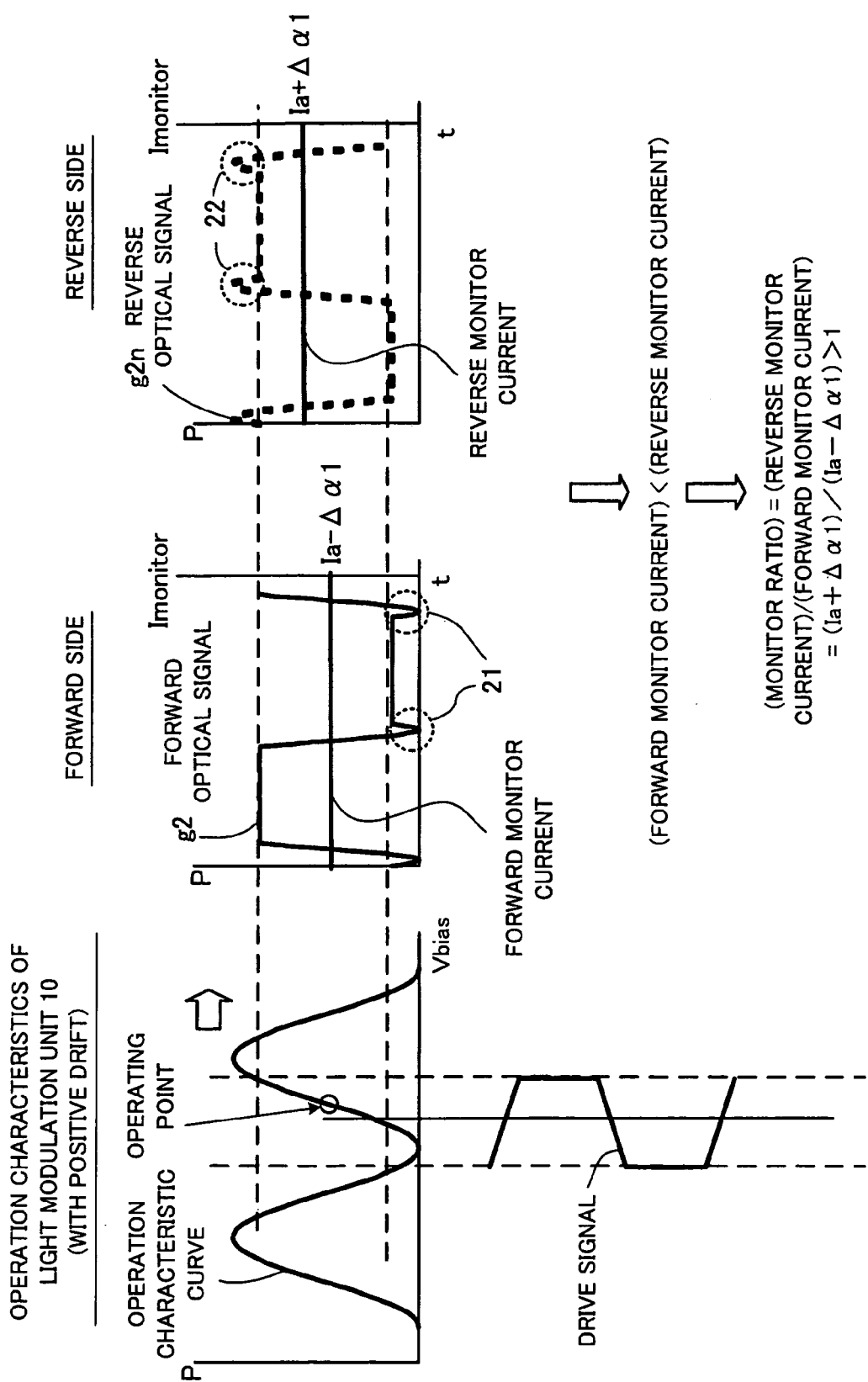
FIG. 3 shows relationships between monitor current and waveforms of output light from the light modulation unit.

FIG. 3 shows relationships between the monitor current and the waveforms of light output from the light modulation unit 10 when the operating point of the light modulation unit 10 has moved in the positive direction with a change in temperature or time.

The positive drift moves the operating point of the light modulation unit 10 on the operation characteristic curve in the positive direction from the position of the central voltage of the drive signal. This movement disturbs the balance between the power of the forward optical signal and the power of the reverse optical signal. In the output light of the light modulation unit 10, the forward optical signal has a waveform represented by a line g2, and the reverse optical signal has a waveform represented by a line g2n.

In FIG. 3, a decrease 21 in the waveform of the forward optical signal appears as an increase 22 in the waveform of the reverse optical signal. The forward monitor current decreases by $\Delta\alpha1$ from the balanced state to Ia−$\Delta\alpha1$, and the reverse monitor current increases by $\Delta\alpha1$ from the balanced state to Ia+$\Delta\alpha1$. Therefore, the monitor ratio is expressed as ((Reverse monitor current)/(Forward monitor current))
=(Ia+$\Delta\alpha1$)/(Ia−$\Delta\alpha1$)

Figure 4:
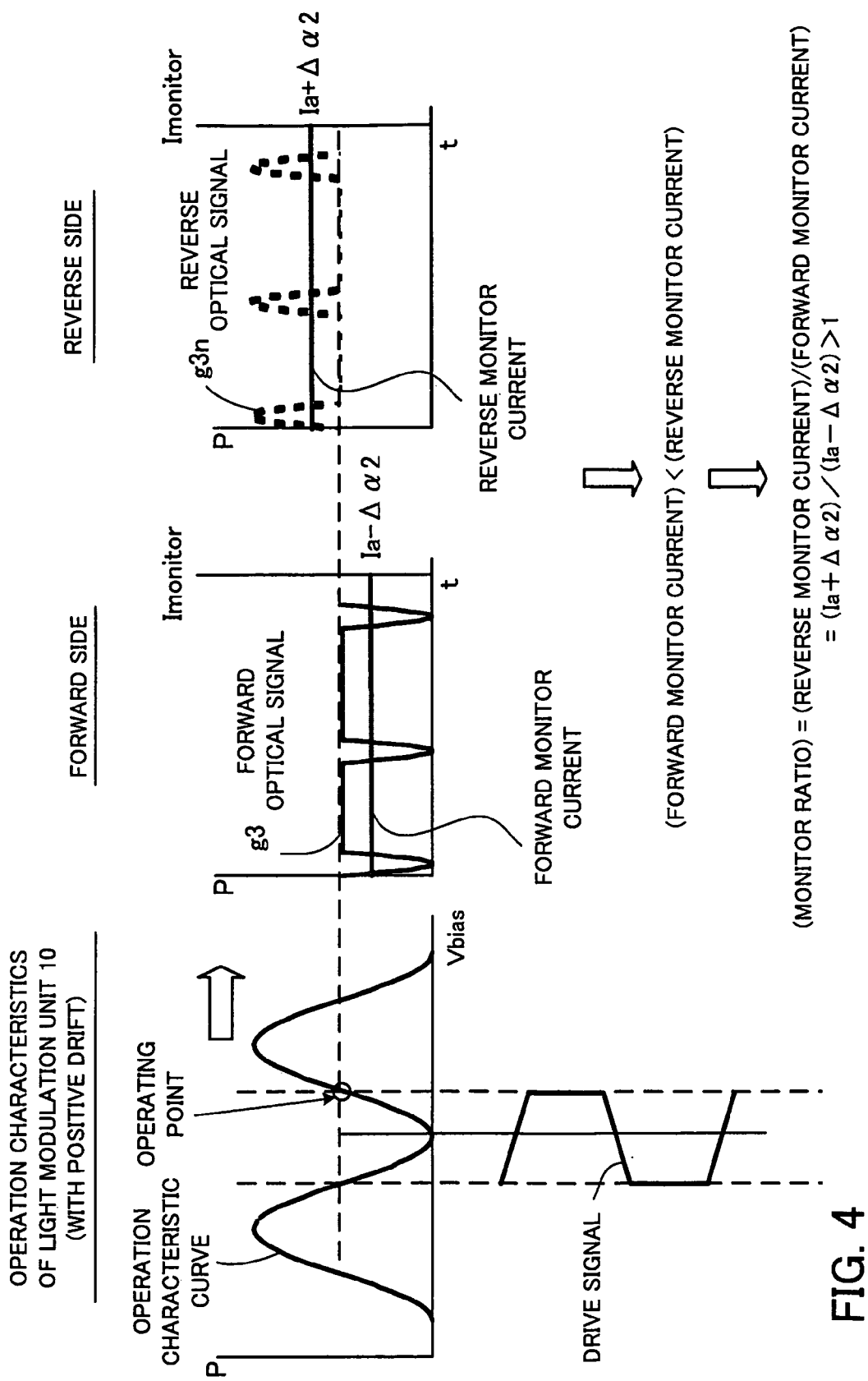
FIG. 4 shows relationships between monitor current and waveforms of output light from a light modulation unit.

FIG. 4 shows relationships between the monitor current and the waveforms of output light from the light modulation unit 10 when the operating point of the light modulation unit 10 has moved in the positive direction with a change in temperature or time. The positive movement is greater than that in FIG. 3.

The positive movement of the operating point on the operation characteristic curve of the light modulation unit 10 from the position of the central voltage of the drive signal is greater than that in FIG. 3. The movement disturbs more the balance between the power of the forward optical signal and the power of the reverse optical signal.

In the output light from the light modulation unit 10, the forward optical signal has a waveform represented by a line g3, and the reverse optical signal has a waveform represented by a line g3n. A decrease in the forward optical signal appears as an increase in the reverse optical signal. The forward monitor current decreases by $\Delta\alpha2$ from the balanced state to Ia−$\Delta\alpha2$, and the reverse monitor current increases by $\Delta\alpha2$ from the balanced state to Ia+$\Delta\alpha2$, where $\Delta\alpha1<\Delta\alpha2$. Therefore, the monitor ratio is expressed as ((Reverse monitor current)/(Forward monitor current))
=(Ia+$\Delta\alpha2$)/(Ia−$\Delta\alpha2$)

Figure 5:
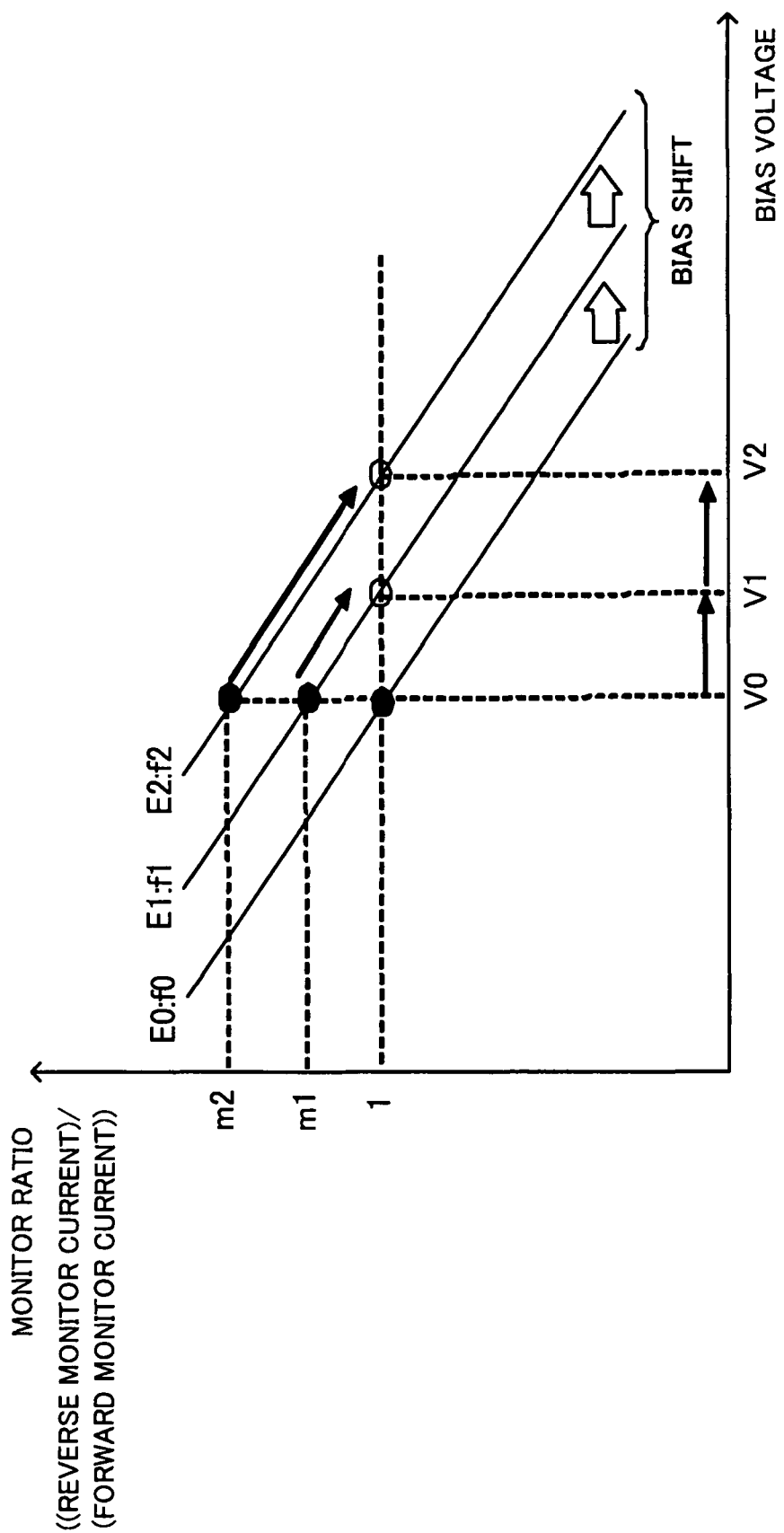
FIG. 5 shows a relationship between the monitor ratio and the bias voltage.

FIG. 5 shows a relationship between the monitor ratio and the bias voltage. The vertical axis represents the monitor ratio, and the horizontal axis represents the bias voltage. The relationship between the monitor ratio and the bias voltage in a certain operating environment can be expressed by a linear function with a negative gradient. With a linear function f0 in an operating environment E0, the monitor ratio is 1 at a bias voltage v0.

If the operation of the light modulation unit 10 moves in the positive direction from the operating environment E0 to an operating environment E1, the monitor ratio at the bias voltage V0 becomes m1, which is greater than 1. Therefore, the bias voltage V0 is increased to V1 so that the monitor ratio becomes 1. With a linear function f1 in the operating environment E1, the monitor ratio becomes 1 at the bias voltage V1.

If the operation of the light modulation unit 10 moves further in the positive direction from the operating environment E0 to an operating environment E2, the monitor ratio at the bias voltage V0 becomes m2, which is greater than m1. Therefore, the bias voltage V0 is increased to V2 so that the monitor ratio becomes 1. With a linear function f2 in the operating environment E2, the monitor ratio becomes 1 at the bias voltage V2.

Changes in the monitor ratio caused by positive drifts of the operating point of the light modulation unit 10 have been described above. If the operating point moves in the negative direction, the monitor ratio decreases, and the amount of change is the same.

The monitor ratio obtained by dividing the reverse monitor current by the forward monitor current becomes greater than 1 when the operating point moves in the positive direction. If the operating point moves in the negative direction, the monitor ratio becomes smaller than 1, but the absolute amount of change is the same.

If the operating point moves in the positive direction, the bias voltage is increased to bring the monitor ratio to 1. If the operating point moves in the negative direction, the bias voltage is decreased to bring the monitor ratio to 1.

As has been described above, the amount of movement of the operating point of the light modulation unit 10 appears as the amount of change in the monitor ratio between the forward monitor current and the reverse monitor current, obtained by monitoring the output light from the light modulation unit 10.

If the monitor ratio is obtained by dividing the reverse monitor current by the forward monitor current, a positive movement of the operating point of the light modulation unit 10 causes the monitor ratio to be greater than 1, and a negative movement of the operating point of the light modulation unit 10 causes the monitor ratio to be smaller than 1. If the operating point of the light modulation unit 10 does not change, the amount of the forward light output equals the amount of the reverse light output. The values of the forward monitor current and the reverse monitor current are the same, bringing the monitor ratio to 1.

Therefore, by monitoring a change in the monitor ratio and performing feedback control of the bias voltage to be applied to the light modulation unit 10 to keep a monitor ratio of 1, optimum bias voltage control can be performed without using the pilot tone, which is conventionally used.

Figure 6:
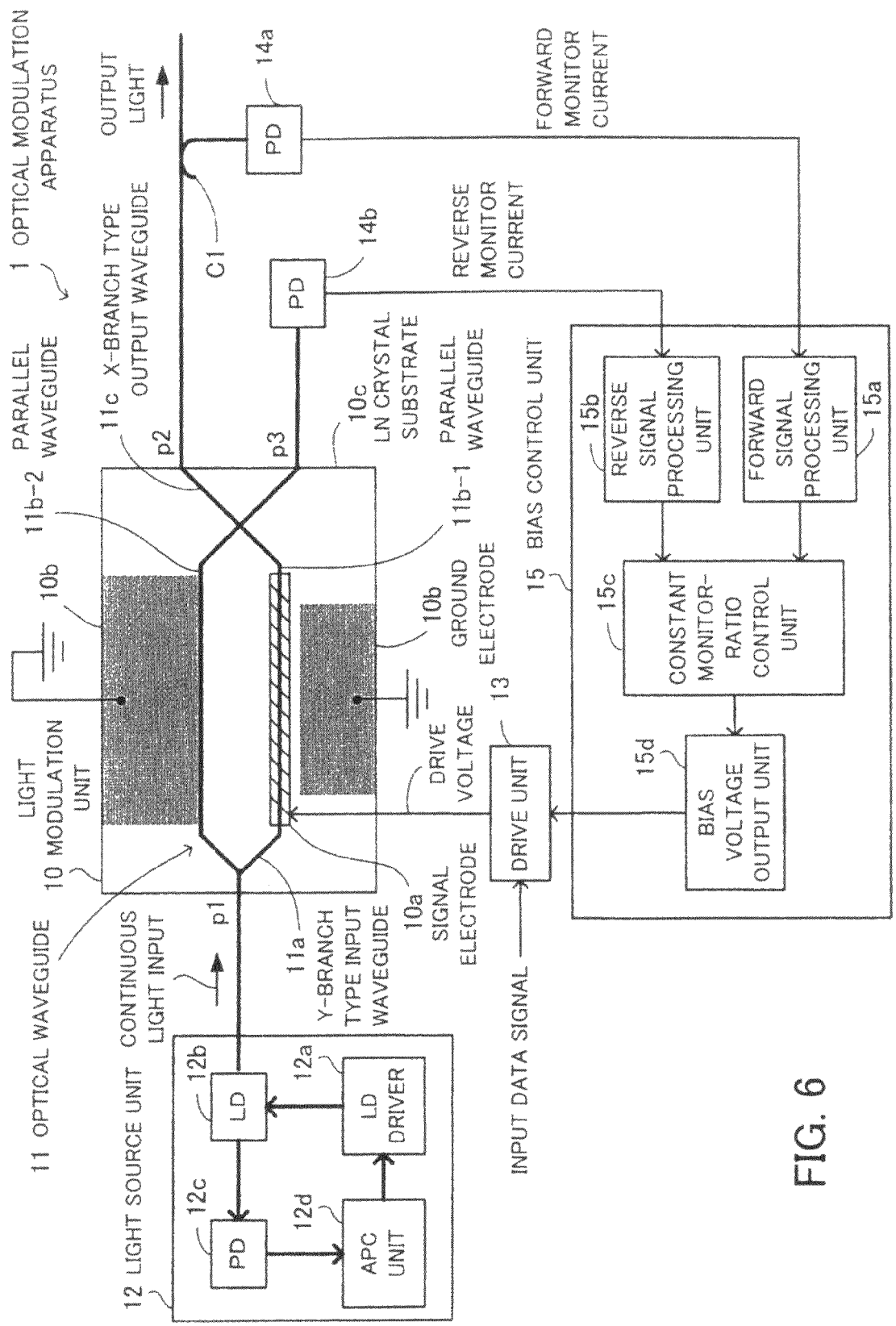
FIG. 6 shows the structure of the optical modulation apparatus.

The structure and operation of the optical modulation apparatus 1 will be described next. FIG. 6 shows the structure of the optical modulation apparatus 1. The optical modulation apparatus 1 includes the light modulation unit 10, the light source unit 12, the drive unit 13, the coupler C1, PDs 14a and 14b, and the bias control unit 15.

The light source unit 12 includes a laser diode (LD) driver 12a, an LD 12b, a PD 12c, and an automatic power control (APC) unit 12d. The LD driver 12a outputs an LD drive current to drive the LD 12b. The LD 12b outputs continuous light with the optical output power based on the LD drive current.

The PD 12c monitors fed-back light from the LD 12b and converts it to an electric signal. The APC unit 12d controls the LD driver 12a in accordance with the electric signal so that the LD 12b outputs light at a constant power. The LD driver 12a adjusts the amount of LD drive current in accordance with an LD drive instruction from the APC unit 12d.

The light modulation unit 10 has an optical waveguide 11 formed on an LN crystal substrate 10c having the electrooptic effect. The optical waveguide 11 includes a Y-branch type input waveguide (1×2 photocouplers) 11a, parallel waveguides 11b-1 and 11b-2, and an X-branch type output waveguide (2×2 photocouplers) 11c.

A signal electrode 10a is formed in a vicinity of the parallel waveguide 11b-1, and ground electrodes 10b are formed on both sides of the signal electrode 10a, in a single electrode structure on the Z-cut substrate, for example.

When continuous output light from the LD 12b enters port p1 of the Y-branch type input waveguide 11a, the input light is split at the division point into two branches in phase, and those branches enter the parallel waveguides 11b-1 and 11b-2.

The refractive indexes of the parallel waveguides 11b-1 and 11b-2 change by $+\Delta n$ and $-\Delta n$ respectively, depending on the drive voltage applied to the optical waveguide 11. This results in a phase difference between the light beams passing the parallel waveguides 11b-1 and 11b-2. (If the phase difference between the parallel waveguides 11b-1 and 11b-2 is 0°, the light beams intensify each other. If the phase difference is $\pi$, the light beams waken each other.)

At the meeting point of the X-branch type output waveguide 11c, the light beams passing the parallel waveguides 11b-1 and 11b-2 interfere with each other, and the interfered light beams are output from output ports p2 and p3 of the X-branch type output waveguide 11c with a phase difference of $\pi/2$. This outputs an intensity-modulated optical signal.

Port p2 outputs a forward optical signal, and port p3 outputs a reverse optical signal. One of the two signals should be taken as intensity-modulated light for optical communication. The shown structure sends out the forward optical signal.

The light modulation unit 10 includes the optical waveguide 11 formed on the LN crystal substrate 10c having the electrooptic effect. Light is turned on or off by changing the interference state by varying the refractive index of either optical path (optical path length). (The on-off repetition speed of the optical pulse is the modulation rate.) Because the electrooptic effect has very fast responses, a high modulation rate such as 10 Gb/s or greater is possible.

Coupler C1 is provided on an optical transmission path connected to port p2 and splits the forward optical signal into two branches, one branch being output to the outside and the other branch being output to the PD 14a. The PD 14a is connected to the branch output end of the coupler C1. The PD 14b is connected to port p3.

The PD 14a receives the forward optical signal and converts it to a forward monitor electric current. The PD 14b receives the reverse optical signal and converts it to a reverse monitor electric current.

The bias control unit 15 includes a forward signal processing unit 15a, a reverse signal processing unit 15b, a constant monitor-ratio control unit 15c, and a bias voltage output unit 15d.

The forward signal processing unit 15a converts the forward monitor current to a voltage signal and then to a forward digital monitor value. The reverse signal processing unit 15b converts the reverse monitor current to a voltage signal and then to a reverse digital monitor value.

The constant monitor-ratio control unit 15c generates a monitor ratio between the forward digital monitor value and the reverse digital monitor value and obtains such a bias voltage control amount that the monitor ratio matches a target value stored in memory (not shown) beforehand. The bias voltage output unit 15d outputs a bias voltage based on the control amount.

The drive unit 13 receives the bias voltage controlled to optimize the operation of the light modulation unit 10, adds the bias voltage to the input data signal to generate a drive signal (a modulated signal obtained by superimposing the bias voltage on the input data signal), and applies the modulated signal to the signal electrode 10a of the light modulation unit 10.

Figure 7:
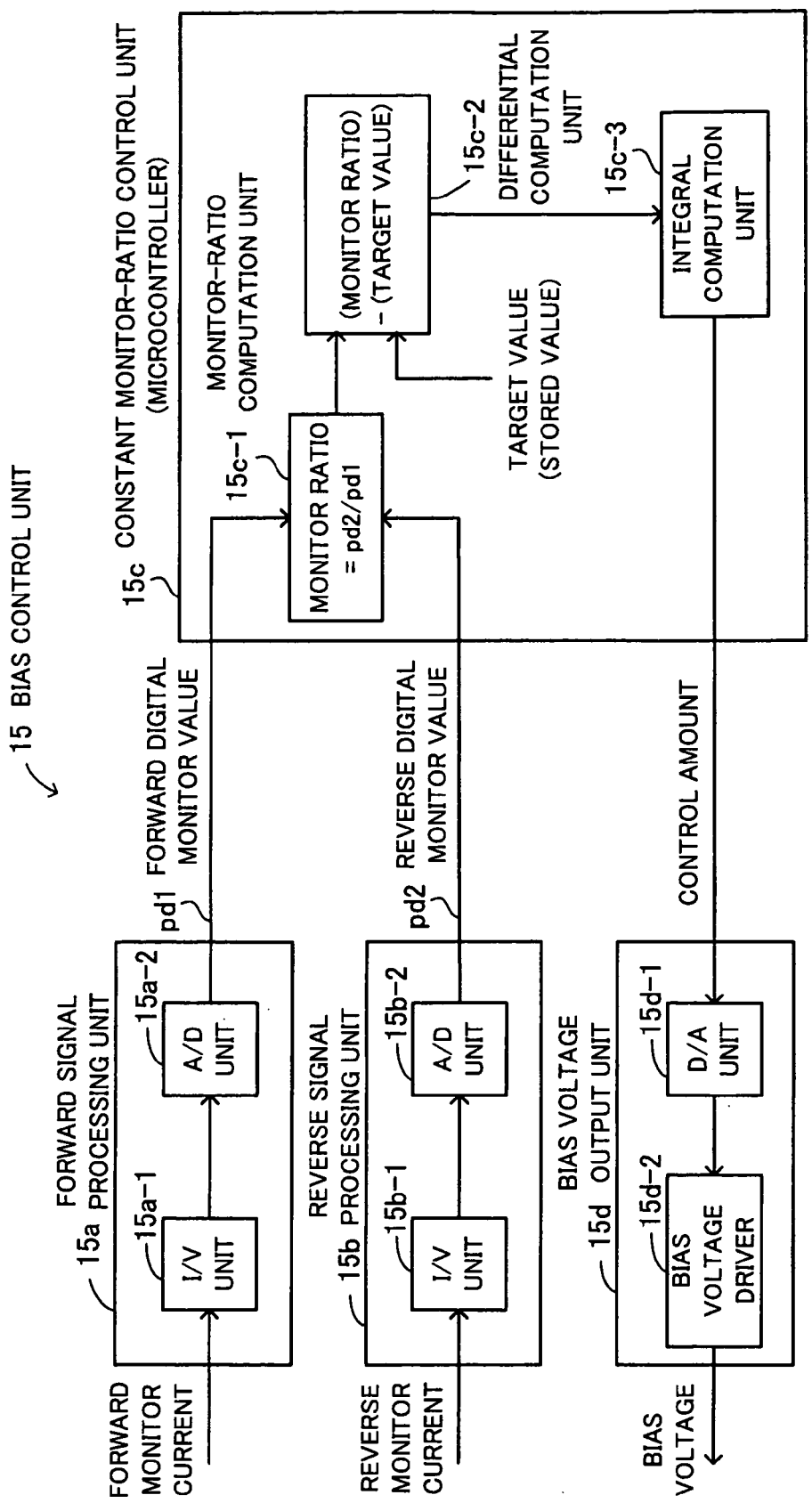
FIG. 7 shows the structure of a bias control unit.

FIG. 7 shows the structure of the bias control unit 15. The bias control unit 15 includes the forward signal processing unit 15a, the reverse signal processing unit 15b, the constant monitor-ratio control unit 15c, and the bias voltage output unit 15d.

The forward signal processing unit 15a includes an I/V unit 15a-1 and an A/D unit 15a-2, and the reverse signal processing unit 15b includes an I/V unit 15b-1 and an A/D unit 15b-2.

The constant monitor-ratio control unit 15c includes a monitor-ratio computation unit 15c-1, a differential computation unit 15c-2, and an integral computation unit 15c-3. The bias voltage output unit 15d includes a D/A unit 15d-1 and a bias voltage driver 15d-2.

The I/V unit 15a-1 converts the forward monitor current output from the PD 14a to a voltage value. The A/D unit 15a-2 converts the analog voltage value to a forward digital monitor value pd1.

The I/V unit 15b-1 converts the reverse monitor current output from the PD 14b to a voltage value. The A/D unit 15b-2 converts the analog voltage value to a reverse digital monitor value pd2.

The monitor-ratio computation unit 15c-1 obtains a monitor ratio between the forward digital monitor value pd1 and the reverse digital monitor value pd2. The differential computation unit 15c-2 obtains the difference between the monitor value and its target value. The integral computation unit 15c-3 integrates (accumulates) the difference value to obtain a control amount. The D/A unit 15d-1 converts the digital control amount to an analog value. The bias voltage driver 15d-2 generates a bias voltage based on the control amount and outputs the bias voltage to the drive unit 13.

An optical communication device having the optical modulation apparatus 1 as an external modulator incorporates a microcontroller, and the microcontroller performs optical communication control by built-in software. The digital computation functions implemented by the monitor-ratio computation unit 15c-1, the differential computation unit 15c-2, and the integral computation unit 15c-3 in the constant monitor-ratio control unit 15c are executed by the microcontroller.

Since automatic bias control for the conventional light modulation unit uses the pilot tone, control circuitry for oscillating the pilot tone, extracting the pilot tone from the intensity-modulated output light, superimposing the pilot tone on the input data signal, and the like is required.

On the contrary, the optical modulation apparatus 1 uses such characteristics that when the operating point of the light modulation unit 10 changes, the amount of change of the operating point is proportional to the amount of change in the monitor ratio between the forward monitor current and the reverse monitor current output from the light modulation unit 10. The optical modulation apparatus 1 is configured to perform bias voltage control to bring the measured monitor ratio toward the target value when the operating point is in the optimum position.

This makes it possible to implement major functions of automatic bias control by computation by the existing microcontroller, without using the pilot tone. The pilot-tone control circuitry as described earlier becomes unnecessary.

Therefore, the scale of the circuitry can be reduced greatly, and the apparatus can be downsized. In addition, with the control process simplified than before, optimum bias voltage control can be performed with high precision.

Figure 8:
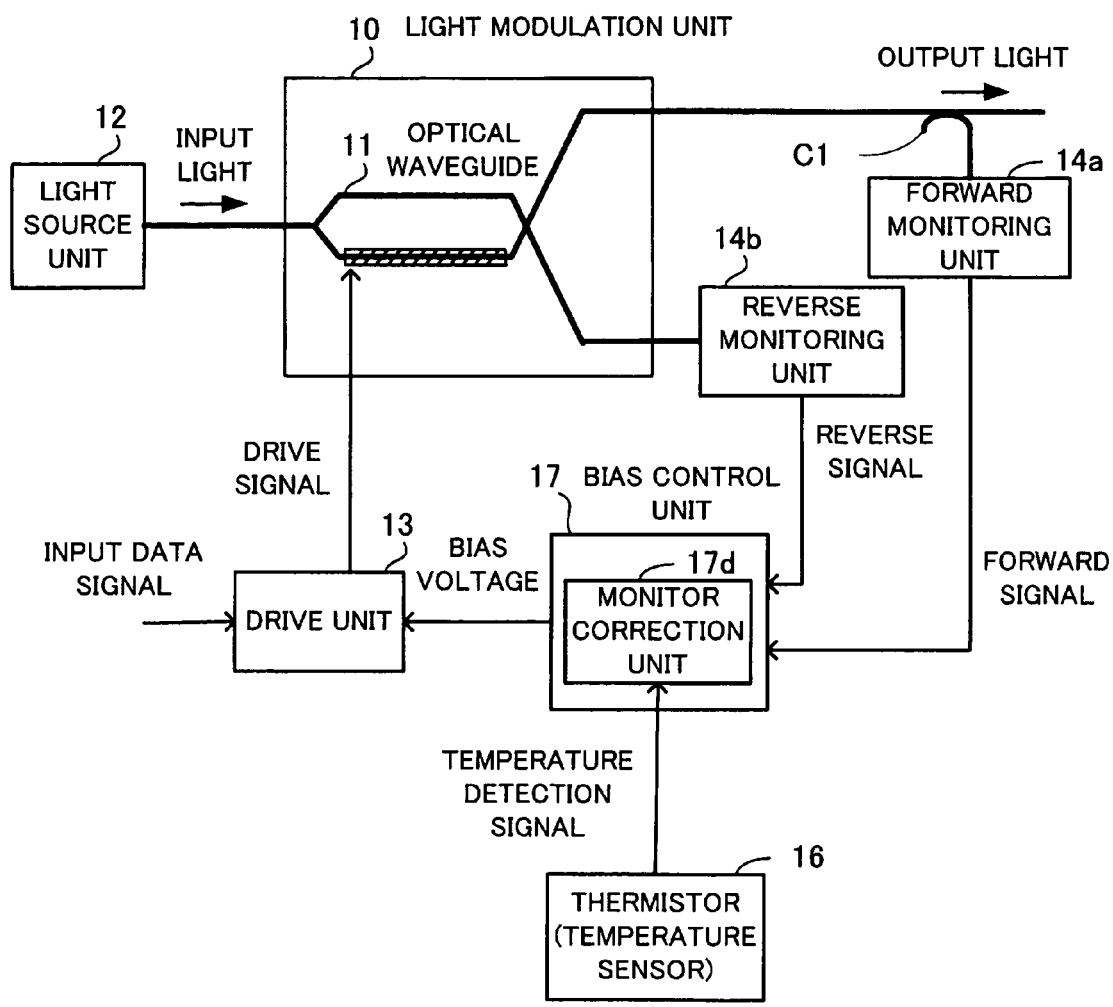
FIG. 8 shows the basic concept of another optical modulation apparatus.

As a modification of the optical modulation apparatus 1, an optical modulation apparatus 1-1 having a function to correct variations in the PDs 14a and 14b will be described. FIG. 8 shows the basic concept of the optical modulation apparatus 1-1. The optical modulation apparatus 1-1 for performing optical modulation includes a light modulation unit 10 that includes an optical waveguide 11 of Mach-Zehnder interferometer type, a light source unit 12, a drive unit 13, a coupler C1, a PD 14a (forward monitoring unit), a PD 14b (reverse monitoring unit), a thermistor (temperature sensor) 16, and a bias control unit 17. The basic operation of the optical modulation apparatus 1-1 is the same as the operation of the optical modulation apparatus 1, shown in FIG. 1, and a monitor correction function is added.

The drive unit 13 generates a drive signal by adding a bias voltage to an input data signal. The light modulation unit 10 modulates continuous light output from the light source unit 12 in accordance with the drive signal and outputs the results as optical signals.

The PD 14a monitors a forward optical signal output from the light modulation unit 10 and split by the coupler C1 and outputs the monitored value as a forward signal (forward monitor current). The PD 14b monitors a reverse optical signal output from the light modulation unit 10 and outputs the monitored value as a reverse signal (reverse monitor current). The thermistor 16 senses the ambient temperature of the optical modulation apparatus 1-1 and outputs an electric temperature detection signal proportional to the sensed temperature.

The bias control unit 17 includes a monitor correction unit 17d. The individual PDs 14a and 14b have different conversion efficiencies (η efficiencies) for converting the optical signal to current. The difference can be caused by variations in ambient temperature or gain, and the difference must be corrected.

The monitor correction unit 17d corrects the conversion efficiency of the PD 14a for converting the forward optical signal to a forward monitor current, and generates a corrected forward signal, which is a corrected forward monitor current.

The monitor correction unit 17d corrects also the conversion efficiency of the PD 14b for converting the reverse optical signal to a reverse monitor current, and generates a corrected reverse signal, which is a corrected reverse monitor current.

The bias control unit 17 obtains a monitor ratio between the corrected forward monitor current and the corrected reverse monitor current, and controls the bias voltage in accordance with the monitor ratio.

The ratio between the corrected forward monitor current and the corrected reverse monitor current, obtained when the operating point of the light modulation unit 10 is in a predetermined position with reference to the operation characteristic curve is obtained beforehand as a target value, and feedback control of the bias voltage is performed to bring the measured monitor ratio to the target value.

Figure 9:
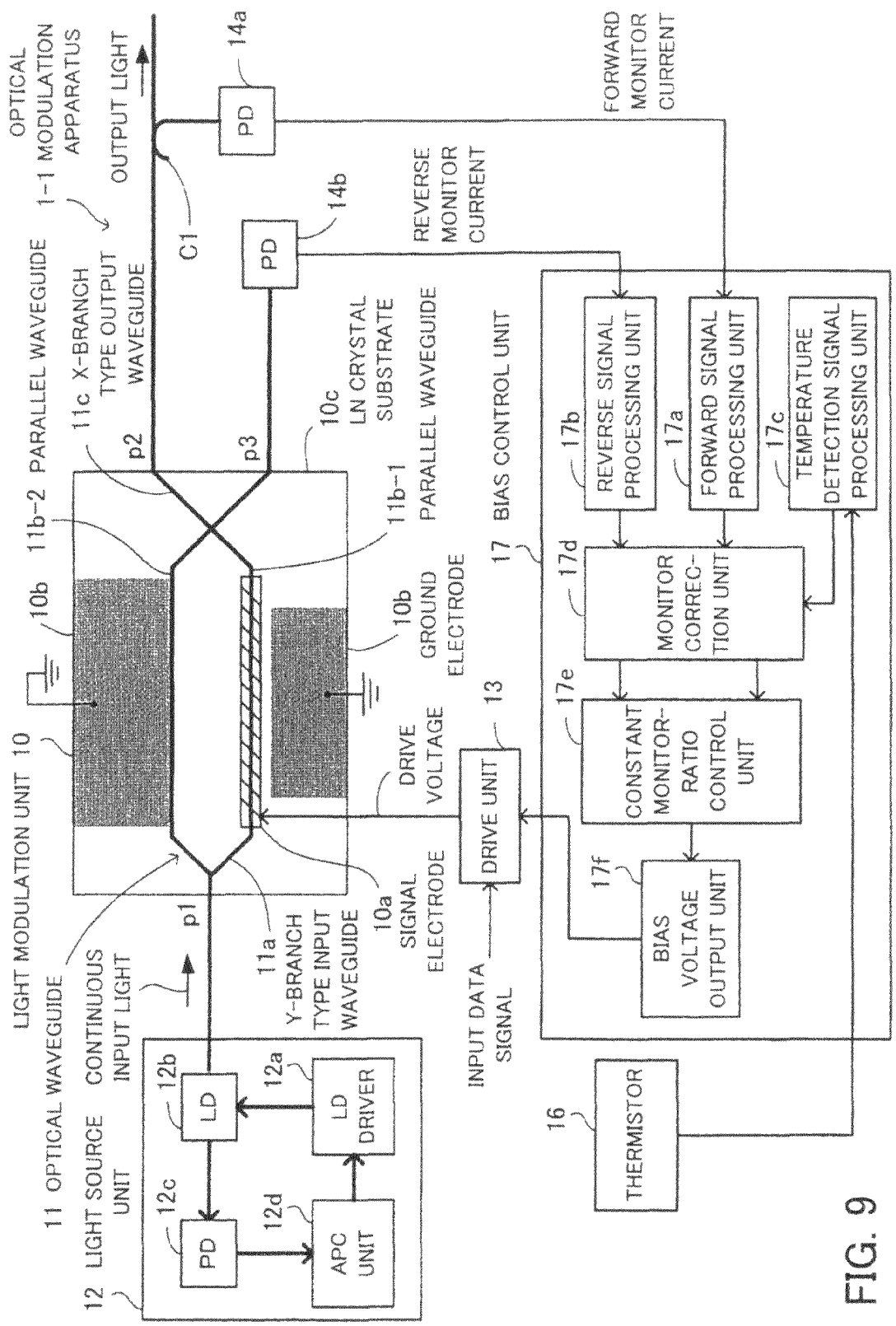
FIG. 9 shows the structure of the optical modulation apparatus.

The structure and operation of the optical modulation apparatus 1-1 will be described next. FIG. 9 shows the structure of the optical modulation apparatus 1-1. The structure is the same as the structure shown in FIG. 6, except for the thermistor 16 and the bias control unit 17. Identical elements are marked with identical reference symbols, and a description of their operation will be omitted.

The optical modulation apparatus 1-1 includes the light modulation unit 10, the light source unit 12, the drive unit 13, the coupler C1, the PDs 14a and 14b, the thermistor 16, and the bias control unit 17.

The thermistor 16 senses the internal temperature of the optical modulation apparatus 1-1 and generates an electric temperature detection signal proportional to the sensed temperature. The bias control unit 17 includes a forward signal processing unit 17a, a reverse signal processing unit 17b, a temperature detection signal processing unit 17c, a monitor correction unit 17d, a constant monitor-ratio control unit 17e, and a bias voltage output unit 17f.

The forward signal processing unit 17a converts the forward monitor current to a voltage signal and further to a forward digital monitor value. The reverse signal processing unit 17b converts the reverse monitor current to a voltage signal and further to a reverse digital monitor value. The temperature detection signal processing unit 17c converts the temperature detection signal sent from the thermistor 16 to a digital value.

The monitor correction unit 17d corrects the forward digital monitor value to generate a corrected forward digital monitor value corresponding to a corrected forward monitor current, and also corrects the reverse digital monitor value to generate a corrected reverse digital monitor value corresponding to a corrected reverse monitor current.

The constant monitor-ratio control unit 17e generates a monitor ratio between the corrected forward digital monitor value and the corrected reverse digital monitor value and obtains such a bias voltage control amount that the monitor ratio matches the target value stored beforehand in memory (not shown). The bias voltage output unit 17f outputs a bias voltage based on the control amount.

The drive unit 13 receives the bias voltage corrected to optimize the operation of the light modulation unit 10, adds the bias voltage to the input data signal to generate a drive signal (a modulated signal obtained by superimposing the bias voltage on the input data signal), and applies the modulated signal to a signal electrode 10a of the light modulation unit 10.

Figure 10:
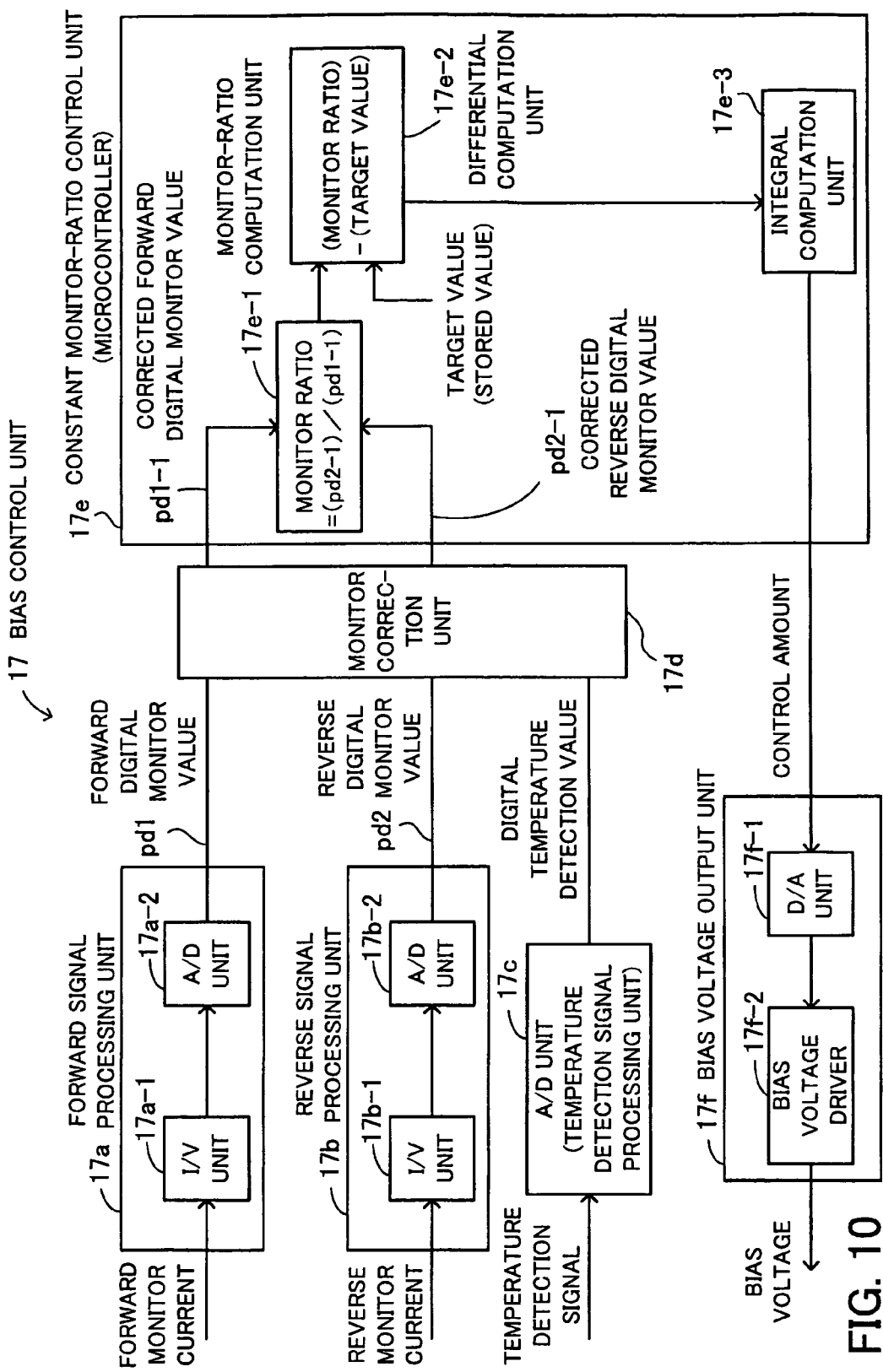
FIG. 10 shows the structure of a bias control unit.
Figure 11:
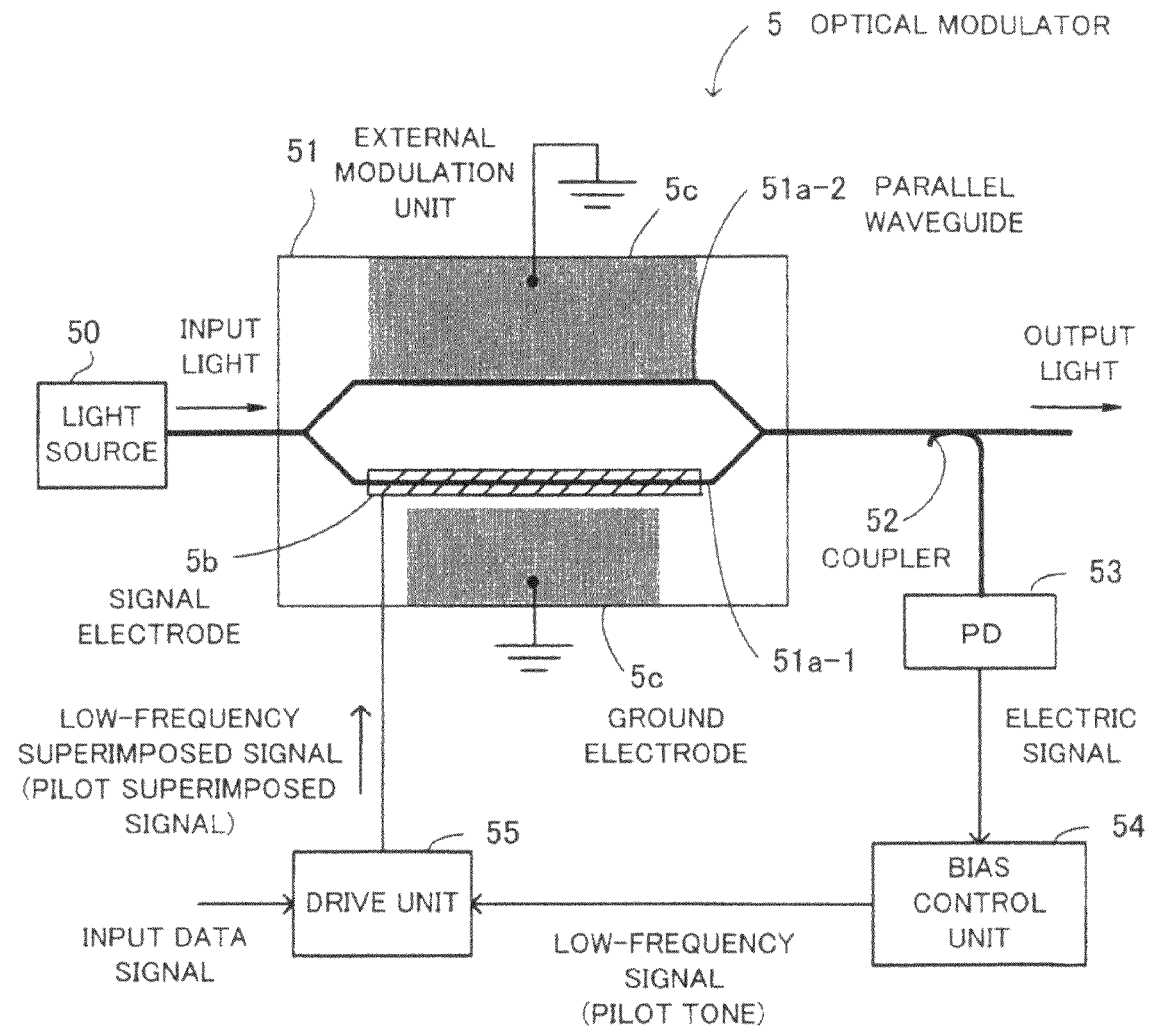
FIG. 11 shows the structure of a conventional optical modulator.
Figure 12:
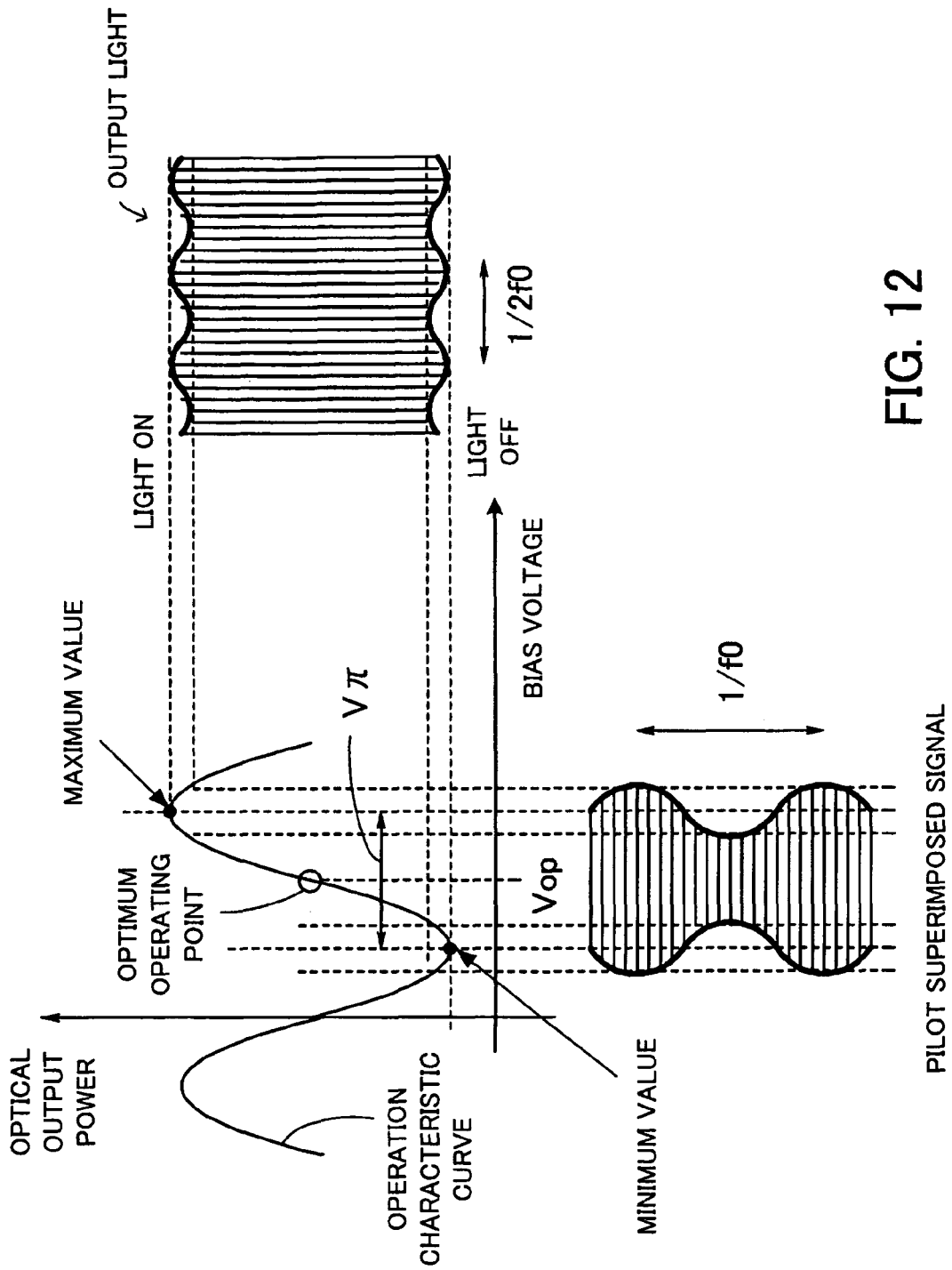
FIG. 12 shows the modulation characteristics of an external modulator.
Figure 13:
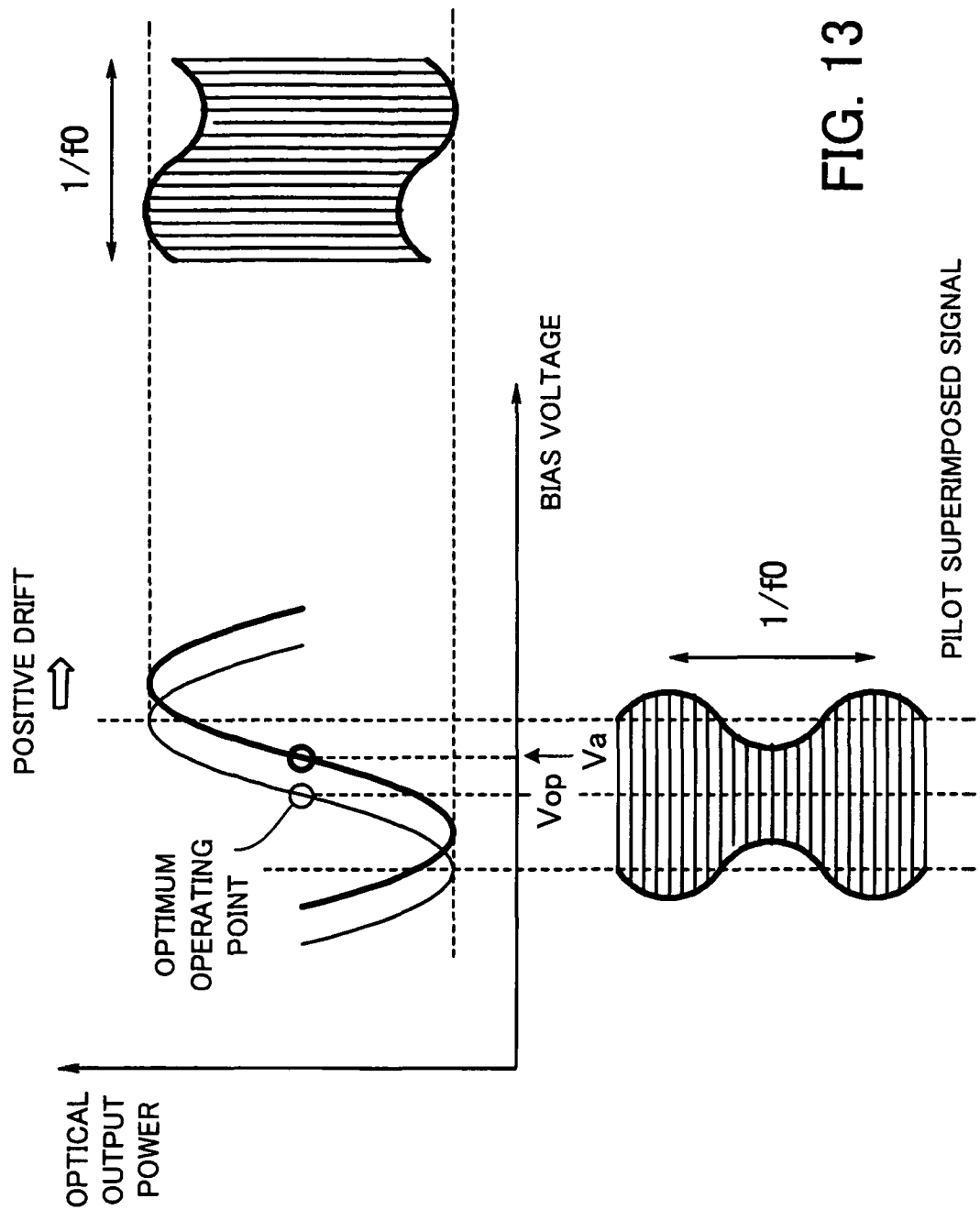
FIG. 13 shows modulation characteristics at a non-optimum operating point.
Figure 14:
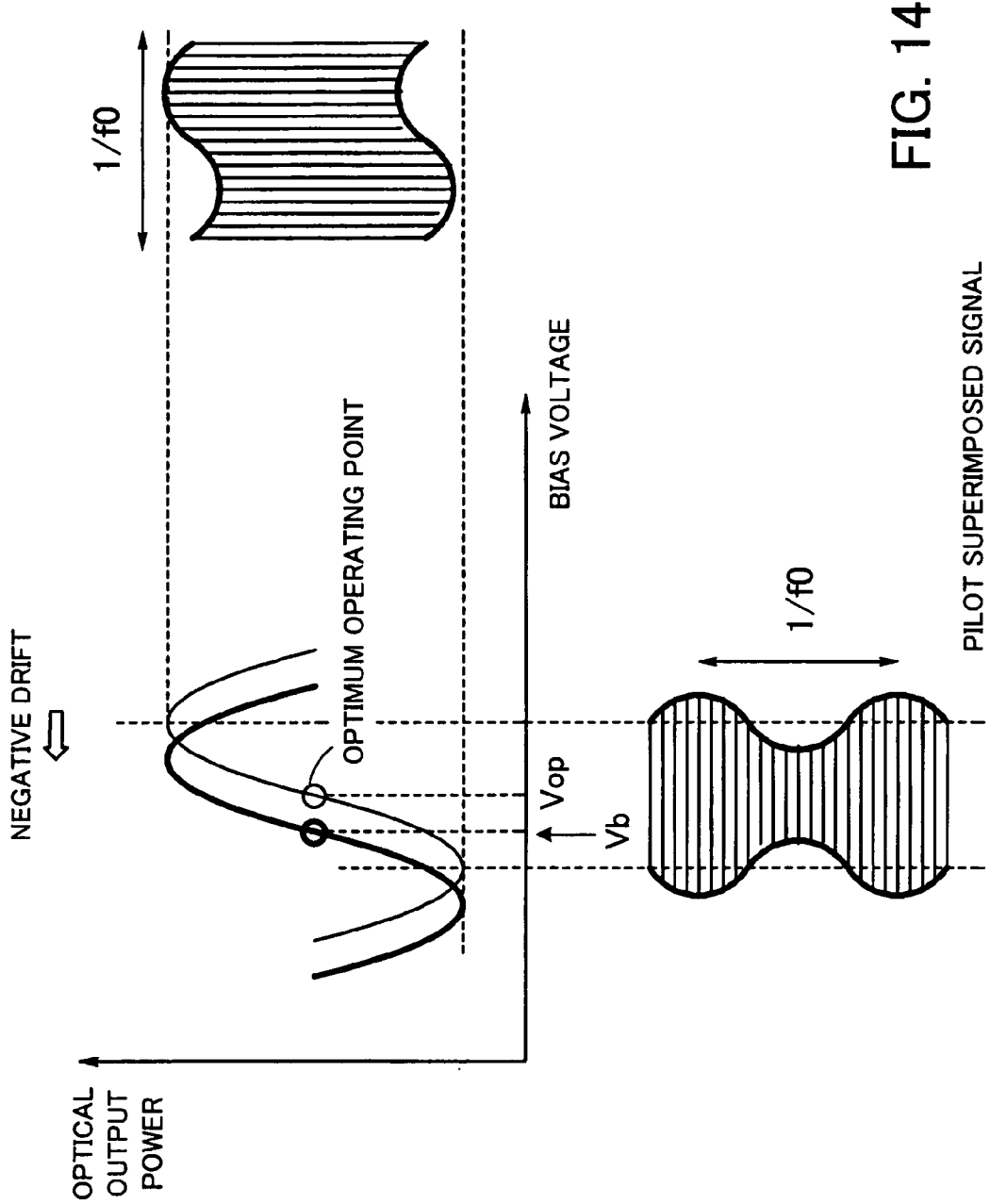
FIG. 14 shows modulation characteristics at another non-optimum operating point.

FIG. 10 shows the structure of the bias control unit 17. The bias control unit 17 includes the forward signal processing unit 17a, the reverse signal processing unit 17b, the A/D unit (temperature detection signal processing unit) 17c, the monitor correction unit 17d, the constant monitor-ratio control unit 17e, and the bias voltage output unit 17f.

The forward signal processing unit 17a includes an I/V unit 17a-1 and an A/D unit 17a-2. The reverse signal processing unit 17b includes an I/V unit 17b-1 and an A/D unit 17b-2.

The constant monitor-ratio control unit 17e includes a monitor-ratio computation unit 17e-1, a differential computation unit 17e-2, and an integral computation unit 17e-3. The bias voltage output unit 17f includes a D/A unit 17f-1 and a bias voltage driver 17f-2.

The I/V unit 17a-1 converts the forward monitor current output from the PD 14a to a voltage value. The A/D unit 17a-2 converts the analog voltage value to a forward digital monitor value pd1.

The I/V unit 17b-1 converts the reverse monitor current output from the PD 14b to a voltage value. The A/D unit 17b-2 converts the analog voltage value to a reverse digital monitor value pd2.

The A/D unit 17c converts the temperature detection signal sent from the thermistor 16, to a digital temperature detection value.

The monitor correction unit 17d receives the forward digital monitor value pd1, the reverse digital monitor value pd2, and the digital temperature detection value, performs correction computation, and generates a corrected forward digital monitor value pd1-1 and a corrected reverse digital monitor value pd2-1.

The monitor-ratio computation unit 17e-1 obtains the monitor ratio between the corrected forward digital monitor value pd1-1 and the corrected reverse digital monitor value pd2-1. The differential computation unit 17e-2 obtains the difference between the monitor value and the target value. The integral computation unit 17e-3 integrates (accumulates) the difference and obtains a control amount.

The D/A unit 17f-1 converts the digital control amount to an analog value. The bias voltage driver 17f-2 generates a bias voltage based on the control amount and outputs the voltage to the drive unit 13.

An optical communication device having the optical modulation apparatus 1-1 as an external modulator incorporates a microcontroller. The microcontroller performs optical communication control by built-in software. The digital computation functions implemented by the monitor-ratio computation unit 17e-1, the differential computation unit 17e-2, and the integral computation unit 17e-3 in the constant monitor-ratio control unit 17e and the monitor correction unit 17d are executed by the microcontroller.

The monitor correction computation carried out by the monitor correction unit 17d will be described next. The correction computation expression will be described first.

In the correction computation expression of the PD 14a, let the value of the forward monitor current be A1, the gain coefficient for correcting the gain of the PD 14a be G1, the temperature variation coefficient for correcting a temperature variation in the PD 14a be K1, and the temperature variation recognized from the temperature detection signal be $\Delta T$. The corrected forward monitor current PD1a is obtained by equation (1):

$$PD1a = A1 \times G1 \times (1 + \Delta T \times K1) \qquad (1)$$

In the correction computation expression of the PD 14b, let the value of the reverse monitor current be A2, the gain coefficient for correcting the gain of the PD 14b be G2, the temperature variation coefficient for correcting a temperature variation in the PD 14b be K2, and the temperature variation recognized from the temperature detection signal be $\Delta T$. The corrected reverse monitor current PD1b is obtained by equation (2):

$$PD1b = A2 \times G2 \times (1 + \Delta T \times K2) \qquad (2)$$

All the parameters values in equations (1) and (2) are converted to digital values, and the computation can be made by the microcontroller. For example, A1 is a forward monitor current converted to a digital value by the forward signal processing unit 17a, and A2 is a reverse monitor current converted to a digital value by the reverse signal processing unit 17b.

Gain coefficients G1 and G2 and temperature variation coefficients K1 and K2 are stored in memory of the microcontroller, and $\Delta T$ is a digital value converted by the temperature detection signal processing unit 17c.

The capabilities of correcting variations in PDs by equations (1) and (2) will be described by using sample numeric values. A PD element 1a is used as the PD 14a, and a PD element 1b is used as the PD 14b.

When the forward and reverse optical signals output from the light modulation unit 10 are monitored without consideration of temperature variations while the light modulation unit 10 is operating at the optimum bias voltage, suppose that the PD element 1a outputs 100 µA as the forward monitor current and that the PD element 1b outputs 150 µA as the reverse monitor current.

When the forward and reverse optical signals of the same power (at the optimum bias voltage) are input to the PD elements 1a and 1b, if the PD elements 1a and 1b have no individual variations, the PD elements 1a and 1b should output the same values of monitor current. Actually, since there are individual variations, the PD element 1a outputs a monitor current of 100 µA, and the PD element 1b outputs a monitor current of 150 µA. The values 100 µA and 150 µA are ideal values without consideration to temperature variations.

If the PD element 1a is used as a reference with the gain coefficient G1 of the PD element 1a being set to 1, the gain coefficient G2 of the PD element 1b is calculated as 100/150=0.667. (By multiplying the gain coefficient G2 of 100/150 by a monitor current of 150 μA of the PD element 1b, the monitor current of the PD element 1b is corrected to 100 μA, which is the same as that of the PD element 1a.)

Since the η efficiency of the PD element varies with temperature, the temperature correction must be considered as well as the gain correction described above. Suppose that the PD element 1a deteriorates by 0.1 dB (2.33%) and that the PD element 1b deteriorates by 0.2 dB (4.71%), at an operating temperature of 50° C.

The temperature variation coefficient of the PD element 1a is 2.33(%)/50° C.=0.0466(%/° C.). The temperature variation coefficient of the PD element 1b is 4.71(%)/50° C.=0.0942 (%/° C.).

If the operating temperature of 50° C. increases by ten degrees (ΔT), the PD element 1a would deteriorate by 0.466% for ten degrees, since the temperature variation coefficient indicates a deterioration of 0.0466% per degree. If temperature variations are considered, the 100-μA monitor current of the PD element 1a deteriorates by 0.466%, and 99.534 μA is output.

If the light modulation unit 10 operates at an operating temperature of 50° C. with the optimum bias voltage, a temperature increase of ten degrees would decrease the forward monitor current A1 of the PD element 1a to 99.534 μA.

According to the temperature variation coefficient, the PD element 1b deteriorates by 0.0942% per degree and by 0.942% for ten degrees. If temperature variations are considered, the 150-μA monitor current of the PD element 1b deteriorates by 0.942%, and 148.587 μA is output.

If the light modulation unit 10 operates at an operating temperature of 50° C. with the optimum bias voltage, a temperature increase of ten degrees would decrease the reverse monitor current A2 of the PD element 1b to 148.587 μA.

Substituting A1=99.534 μA, gain coefficient G1=1, temperature difference ΔT=10° C., temperature variation coefficient K1=0.0466/100 into equation (1) yields equation (1a):

$$PD1a = 99.534 (\mu A) \times 1 \times (1 + 10(°C) \times 0.0466/100) \quad (1a)$$
$$= 100$$

Substituting A2=148.587 μA, gain coefficient G2=0.667, temperature difference ΔT=10° C., temperature variation coefficient K2=0.0942/100 into equation (2) yields equation (2a):

$$PD1b = 148.587 (\mu A) \times 0.667 \times (1 + 10(°C) \times 0.0942/100) \quad (2a)$$
$$= 100$$

From the equations, $$PD1b/PD1a = 100/100 = 1$$

Therefore, when the forward optical signal and reverse optical signal of the light modulation unit 10 are monitored by using the PD elements 1a and 1b, individual variations in conversion efficiency of the PD elements can be corrected through the computation of the equations (1) and (2).

Since optimum bias voltage control for optical modulation can be performed without using the pilot tone, the circuitry can be downsized, and the control process can be simplified.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical modulation apparatus for performing optical modulation, comprising:
   a driver to generate a drive signal by adding a bias voltage to an input data signal;
   a light modulator to modulate input light in accordance with the drive signal and output optical signals;
   a forward monitor to monitor one of the optical signals and output a forward signal;
   a reverse monitor to monitor another one of the optical signals and output a reverse signal; and
   a bias controller to obtain a monitor ratio between the forward signal and the reverse signal and control the bias voltage on the basis of the monitor ratio;
   wherein the bias controller controls the bias voltage to bring the monitor ratio to a target ratio, obtained when an operating point of the light modulator is in a predetermined position on an operation characteristic curve of the light modulator.

2. The optical modulation apparatus according to claim 1, wherein the bias controller obtains the monitor ratio by dividing a value of the reverse signal by a value of the forward signal and specifies the target ratio of '1';
   when the monitor ratio is greater than '1', the bias controller recognizes that the operation characteristics of the light modulator have changed in a positive direction and increases the bias voltage to bring the monitor ratio to '1'; and
   when the monitor ratio is less than '1', the bias controller recognizes that the operation characteristics of the light modulator have changed in a negative direction and decreases the bias voltage to bring the monitor ratio to '1'.

3. The optical modulation apparatus according to claim 1, wherein the bias controller comprises:
   a forward signal processor to convert an electric current value of the forward signal to a forward voltage signal and generate a forward digital monitor value through A-D conversion;
   a reverse signal processor to convert an electric current value of the reverse signal to a reverse voltage signal and generate a reverse digital monitor value through A-D conversion;
   a constant monitor-ratio controller to calculate a monitor ratio from the forward digital monitor value and the reverse digital monitor value, obtain a difference between the monitor ratio and the target ratio, and generate a control amount on the basis of the difference, operations of the constant monitor-ratio controller being implemented by a microcontroller; and
   a bias voltage generator to output the bias voltage in accordance with the control amount.

4. An optical modulation apparatus for performing optical modulation, comprising:
   a driver to generate a drive signal by adding a bias voltage to an input data signal;

a light modulator to modulate input light in accordance with the drive signal and output optical signals;

a forward monitor to monitor one of the optical signals and output a forward signal;

a reverse monitor to monitor another one of the optical signals and output a monitored value as a reverse signal; and a bias controller which comprises a monitor corrector to correct an efficiency of conversion from the forward signal to a forward signal monitor current, generate a corrected forward signal, correct an efficiency of conversion from the reverse signal to a reverse signal monitor current, and generate a corrected reverse signal, obtains a monitor ratio between the corrected forward signal and the corrected reverse signal, and controls the bias voltage on the basis of the monitor ratio;

wherein the bias controller controls the bias voltage to bring the monitor ratio to a target ratio, obtained when an operating point of the light modulator is in a predetermined position on an operation characteristic curve of the light modulator.

5. The optical modulation apparatus according to claim 4, wherein the bias controller obtains the monitor ratio by dividing a value of the corrected reverse signal by a value of the corrected forward signal and specifies the target ratio of '1';

when the monitor ratio is greater than '1', the bias controller recognizes that the operation characteristics of the light modulator have changed in a positive direction and increases the bias voltage to bring the monitor ratio to '1'; and when the monitor ratio is less than '1', the bias controller recognizes that the operation characteristics of the light modulator have changed in a negative direction and decreases the bias voltage to bring the monitor ratio to '1'.

6. The optical modulation apparatus according to claim 4, further comprising a temperature sensor to sense temperature and output a temperature detection signal proportional to the sensed temperature, wherein the monitor corrector obtains the corrected forward signal by carrying out correction computation $$A1 \times G1 \times (1+\Delta T \times K1)$$

where A1 is a value of the forward monitor current before correction, G1 is a gain coefficient for correcting a gain of the forward monitor, K1 is a temperature variation coefficient to correct a temperature change in the forward monitor, and $\Delta T$ is a temperature change recognized from the temperature detection signal, and obtains the corrected reverse signal by carrying out correction computation $$A2 \times G2 \times (1+\Delta T \times K2)$$

where A2 is a value of the reverse monitor current before correction, G2 is a gain coefficient for correcting a gain of the reverse monitor, K2 is a temperature variation coefficient to correct a temperature change in the reverse monitor, and $\Delta T$ is the temperature change recognized from the temperature detection signal.

7. The optical modulation apparatus according to claim 6, wherein the bias controller comprises:

a forward signal processor to convert a value of the forward monitor current to a forward voltage signal and generate a forward digital monitor value through A-D conversion;

a reverse signal processor to convert a value of the reverse monitor current to a reverse voltage signal and generate a reverse digital monitor value through A-D conversion;

a temperature detection signal processor to convert the temperature detection signal to a digital temperature detection value through A-D conversion;

a monitor corrector to generate a corrected forward digital monitor value corresponding to the corrected forward signal by carrying out correction computation of the forward digital monitor value and generate a corrected reverse digital monitor value corresponding to the corrected reverse signal by carrying out correction computation of the reverse digital monitor value;

a constant monitor-ratio controller to calculate the monitor ratio from the corrected forward digital monitor value and the corrected reverse digital monitor value, obtain a difference between the monitor ratio and the target ratio, and generate a control amount on the basis of the difference, operations of the constant monitor-ratio controller being implemented by a microcontroller; and a bias voltage generator to output the bias voltage in accordance with the control amount.

* * * * *